(12) United States Patent
Husted et al.

(10) Patent No.: US 11,425,534 B2
(45) Date of Patent: Aug. 23, 2022

(54) WIRELESS CONTACT TRACKING

(71) Applicant: Atmosic Technologies Inc., Campbell, CA (US)

(72) Inventors: Paul Husted, Clarence, NY (US); Seung Baek Yi, Nashville, TN (US); Srenik Mehta, Fremont, CA (US)

(73) Assignee: Atmosic Technologies, Inc., Campbell, CA (US)

( * ) Notice: Subject to any disclaimer, the term of this patent is extended or adjusted under 35 U.S.C. 154(b) by 0 days.

(21) Appl. No.: 17/307,908

(22) Filed: May 4, 2021

(65) Prior Publication Data

US 2021/0345068 A1 Nov. 4, 2021

Related U.S. Application Data

(60) Provisional application No. 63/019,918, filed on May 4, 2020.

(51) Int. Cl.
*H04W 4/029* (2018.01)
*H04B 1/3827* (2015.01)
*H04W 4/80* (2018.01)

(52) U.S. Cl.
CPC ............ *H04W 4/029* (2018.02); *H04B 1/385* (2013.01); *H04W 4/80* (2018.02)

(58) Field of Classification Search
CPC ......... H04W 4/029; H04W 4/80; H04B 1/385

USPC ....................................................... 455/41.2
See application file for complete search history.

(56) References Cited

U.S. PATENT DOCUMENTS

| 9,267,112 | B2* | 2/2016 | Chiu | G01N 33/56983 |
| 10,221,218 | B2* | 3/2019 | Chiu | C07K 14/005 |
| 10,237,389 | B2* | 3/2019 | Mandapaka | A61B 5/14532 |
| 2018/0052970 | A1* | 2/2018 | Boss | G06F 21/35 |
| 2020/0302452 | A1* | 9/2020 | Platt | H04W 4/029 |
| 2022/0109949 | A1* | 4/2022 | Alemi | H04W 4/025 |

* cited by examiner

*Primary Examiner* — April G Gonzales
(74) *Attorney, Agent, or Firm* — Paradice & Li LLP

(57) ABSTRACT

A Bluetooth Low Energy (BLE) device may collect one or more resolvable public identifiers from one or more wireless devices, each of the resolvable public identifiers indicating whether a user associated with a respective one of the wireless devices is a possible virus carrier. The BLE device may generate a timestamp for each of the collected resolvable public identifiers, each timestamp indicating a time at which a corresponding resolvable public identifier was received by the BLE device. The BLE device may share the collected resolvable public identifiers and their corresponding timestamps with a paired device. The BLE device may receive, from the paired device, an indication of whether one or more of the collected resolvable public identifiers is associated with a possible virus carrier. The BLE device may be included within or attached to one of a bracelet, neckless, a belt, watch, a smartwatch, or a key fob.

20 Claims, 4 Drawing Sheets

WIRELESS CONTACT TRACKING

CROSS-REFERENCE TO RELATED APPLICATIONS

This Patent Application claims priority to U.S. Provisional Patent Application No. 63/019,918 entitled "WIRELESS CONTACT TRACKING" and filed on May 4, 2020, which is assigned to the assignee hereof. The disclosures of all prior Applications are considered part of and are incorporated by reference in this Patent Application.

TECHNICAL FIELD

The present implementations relate generally to wireless devices, and specifically to wireless contact tracking devices.

BACKGROUND OF RELATED ART

Tracking the movement and contact between people is critical during times of a viral pandemic. Comprehensive and anonymous contact tracking may enable the notification of people when they have come in contact with others identified as viral carriers. Smartphones, which have been largely adopted by many people, may be used to anonymously track the interactions between people. Furthermore, Apple and Google have proposed a mechanism that anonymously tracks user contacts using Bluetooth transceivers found on many smartphones.

Smartphone use may not be possible or feasible with many users. For example, children or elderly may not have access or desire a smartphone. Furthermore, there may be some scenarios where smartphone use is not practical. For example, smartphone use in fitness settings or some workplaces may be prohibited. Thus, there is a need for contact tracking for people who do not use or have access to smartphones.

SUMMARY

The systems, methods and devices of this disclosure each have several innovative aspects, no single one of which is solely responsible for the desirable attributes disclosed herein.

One innovative aspect of the subject matter described in this disclosure can be implemented as a method. In some implementations, the method may be performed by a wearable Bluetooth Low Energy (BLE) device, and may include collecting one or more resolvable public identifiers from one or more wireless devices, each of the one or more resolvable public identifiers indicating whether a user associated with a respective one of the wireless devices is a possible virus carrier. The method may include generating a timestamp for each of the collected resolvable public identifiers, each timestamp indicating a time at which a corresponding resolvable public identifier was received by the BLE device. The method may include sharing the collected resolvable public identifiers and their corresponding timestamps with a paired device. The method may also include receiving, from the paired device, an indication of whether one or more of the collected resolvable public identifiers is associated with a possible virus carrier. In some instances, the paired device may be one of a cellular phone, a smartphone, a tablet computer, a laptop computer, or another BLE device. In some other instances, the BLE device may be included within or attached to one of a bracelet, neckless, a belt, watch, a smartwatch, or a key fob.

In some implementations, the one or more resolvable public identifiers may be collected in one or more BLE advertising beacons, and the indication may further indicate that a user of the BLE device was within a BLE communications range of the possible virus carrier. In some instances, the indication may be based on a comparison between the one or more collected resolvable public identifiers and a plurality of stored resolvable public identifiers. The plurality of stored resolvable public identifiers may be available from a server. In some aspects, the comparison may be associated with a match between at least one of the collected resolvable public identifiers and one or more of the stored resolvable public identifiers.

In some implementations, the method may also include notifying a user of the BLE device of the possible virus carrier. In other implementations, the method may also include generating a unique resolvable public identifier indicative of whether a user of the BLE device is a possible virus carrier, and transmitting the unique resolvable public identifier to one or more nearby devices. In some instances, the unique resolvable public identifier is transmitted in a BLE advertising beacon.

Another innovative aspect of the subject matter described in this disclosure can be implemented in a BLE device. The BLE device may include one or more transceivers, one or more processors, and a memory. In some implementations, the memory may store instructions that, when executed by the one or more processors, cause the BLE device to collect one or more resolvable public identifiers from one or more wireless devices, each of the one or more resolvable public identifiers indicating whether a user associated with a respective one of the wireless devices is a possible virus carrier. Execution of the instructions may also cause the BLE device to generate a timestamp for each of the collected resolvable public identifiers, each timestamp indicating a time at which a corresponding resolvable public identifier was received by the BLE device. Execution of the instructions may also cause the BLE device to share the collected resolvable public identifiers and their corresponding timestamps with a paired device. Execution of the instructions may also cause the BLE device to receive, from the paired device, an indication of whether one or more of the collected resolvable public identifiers is associated with a possible virus carrier. In some instances, the paired device may be one of a cellular phone, a smartphone, a tablet computer, a laptop computer, or another BLE device. In some other instances, the BLE device may be included within or attached to one of a bracelet, neckless, a belt, watch, a smartwatch, or a key fob.

In some implementations, the one or more resolvable public identifiers may be collected in one or more BLE advertising beacons, and the indication may further indicate that a user of the BLE device was within a BLE communications range of the possible virus carrier. In some instances, the indication may be based on a comparison between the one or more collected resolvable public identifiers and a plurality of stored resolvable public identifiers. The plurality of stored resolvable public identifiers may be available from a server. In some aspects, the comparison may be associated with a match between at least one of the collected resolvable public identifiers and one or more of the stored resolvable public identifiers.

In some implementations, execution of the instructions may also cause the BLE device to notify a user of the BLE device of the possible virus carrier. In other implementations, execution of the instructions may also cause the BLE device to generate a unique resolvable public identifier indicative of whether a user of the BLE device is a possible virus carrier, and transmit the unique resolvable public identifier to one or more nearby devices. In some instances, the unique resolvable public identifier is transmitted in a BLE advertising beacon.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like numbers reference like elements throughout the drawings and specification.

DETAILED DESCRIPTION

Figure 1:
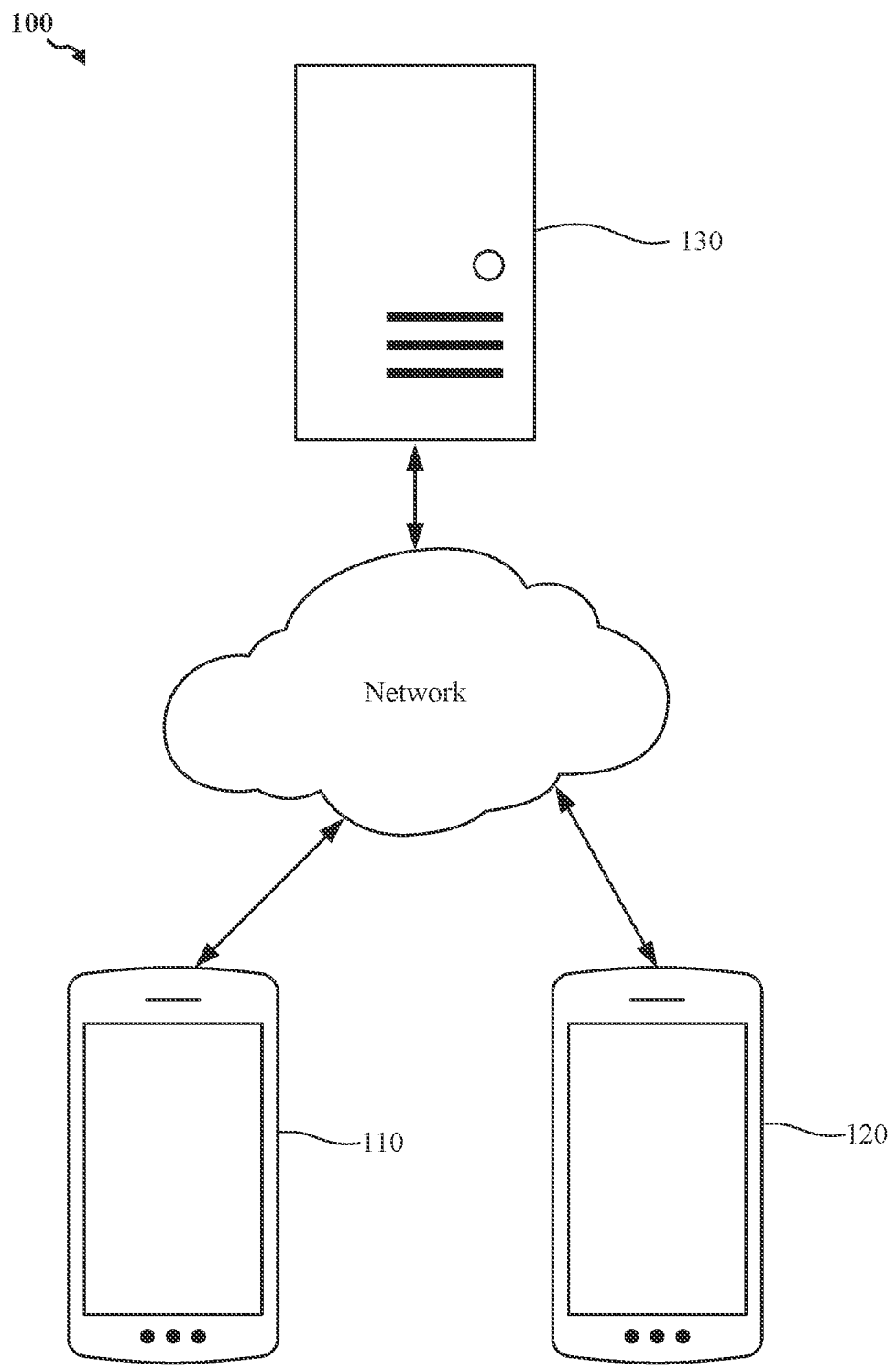
FIG. 1 shows a block diagram of a wireless tracking system.

In the following description, numerous specific details are set forth such as examples of specific components, circuits, and processes to provide a thorough understanding of the disclosure. The term "coupled" as used herein means coupled directly to or coupled through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the disclosure. Any of the signals provided over various buses described herein may be time-multiplexed with other signals and provided over one or more common buses. One or more of the signals may be wired or wireless. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described below. The non-transitory computer-readable storage medium may form part of a computer program product, which may include packaging materials.

The non-transitory computer-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a computer-readable communication medium that carries or communicates code in the form of instructions or data structures and that may be accessed, read, and/or executed by a computer or other processor.

The various illustrative logical blocks, modules, circuits and instructions described in connection with the implementations disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general-purpose processor may be a microprocessor, but in the alternative, the processor may be any conventional processor, controller, microcontroller, or state machine. A processor may also be implemented as a combination of computing devices (such as a combination of a DSP and a microprocessor), a plurality of microprocessors, one or more microprocessors in conjunction with a DSP core, or any other suitable configuration.

FIG. 1 shows a block diagram of a wireless tracking system 100. The wireless tracking system 100 may include a first smartphone 110, a second smartphone 120 and a central server 130. The smartphones 110 and 120 may each include Bluetooth, Wi-Fi and LTE transceivers. In some implementations, each smartphone 110 and 120 may communicate with the central server 130 through a wireless and/or wired communications network. For example, in some instances, the smartphones 110 and 120 may communicate with each other or with the central server 130 using wireless communications governed by one or more releases of the Third Generation Partnership Project (3GPP) or the IEEE 802.11 family of wireless communication standards. Although smartphones are described herein, persons skilled in the art will recognize that tablets, laptops, or any other feasible devices may be used in place of, or in conjunction with the smartphones.

In various implementations, the smartphones 110 and 120 may generate anonymous identifiers, sometimes referred to as resolvable public identifiers. The resolvable public identifiers may be generated periodically by respective smartphones 110 and 120 to maintain user anonymity. The smartphones 110 and 120 may broadcast their respective resolvable public identifiers using Bluetooth low-energy (BLE) advertising beacons. To anonymously track the possible exposure of users to people contagious with a particular virus, the smartphones 110 and 120 may periodically scan for advertising beacons broadcast by other devices. For example, the smartphone 110 may scan and detect a resolvable public identifier in an advertising beacon broadcast from the smartphone 120. The smartphone 110 may log or record the detected resolvable public identifier and generate a timestamp indicating the time at which the resolvable public identifier was received by the smartphone 110. In some instances, the smartphone 110 may estimate the distance to the other smartphone 120, and store the estimated distance along with the corresponding resolvable public identifier and timestamp. The smartphone 110 may use any suitable technique to estimate the distance to the other smartphone 120. In some instances, the smartphone 110 may use one or more of the round-trip time (RTT) of a signal exchange between the smartphones 110 and 120, the time-of-flight (ToF) of a signal transmitted between the smartphones 110 and 120, the received signal strength indicator (RSSI) value of a wireless signal received from the smartphone 120, and so on. In this manner, the smartphone 110 may construct a list of other smartphones that were close enough for the smartphone 110 to receive BLE adverting beacons with resolvable public identifiers from the other smartphones 120.

In some implementations, the central server 130 may store a plurality of resolvable public identifiers associated with smartphone users identified as possible virus carriers and/or as possibly have been exposed to certain viruses. In some instances, the smartphone 110 may download or retrieve a list of resolvable public identifiers from the central server 130, and may compare the resolvable public identifiers obtained from the central server 130 with the resolvable public identifiers stored locally in the smartphone 110. If there is a match, then the user of the smartphone 110 may determine that he or she may have come into contact with a potential virus carrier.

As discussed, the resolvable public identifiers transmitted from other smartphones may change periodically and, therefore, may be valid for a time period after reception by the smartphone 110. As such, when identifying matches between the resolvable public identifiers obtained from the central server 130 and the locally stored resolvable public identifiers, the smartphone 110 may also determine whether the timestamp of a matching locally stored resolvable public identifier falls within a time period of the timestamp of a corresponding matching resolvable public identifier obtained from the central server 130. If a match is identified between a respective one of the obtained resolvable public identifiers and a respective one of the locally stored resolvable public identifiers, the smartphone 110 may present one or more options or actions for the user. The one or more options or actions may include (but are not limited to) contacting medical personnel, obtaining a certain medicine, and so on. In some instances, the smartphone 110 may upload resolvable public identifiers to the central server 130 in response to determining that the user carries or has been exposed to the virus. In some other instances, the resolvable public identifiers may be encrypted using one or more keys.

Figure 2:
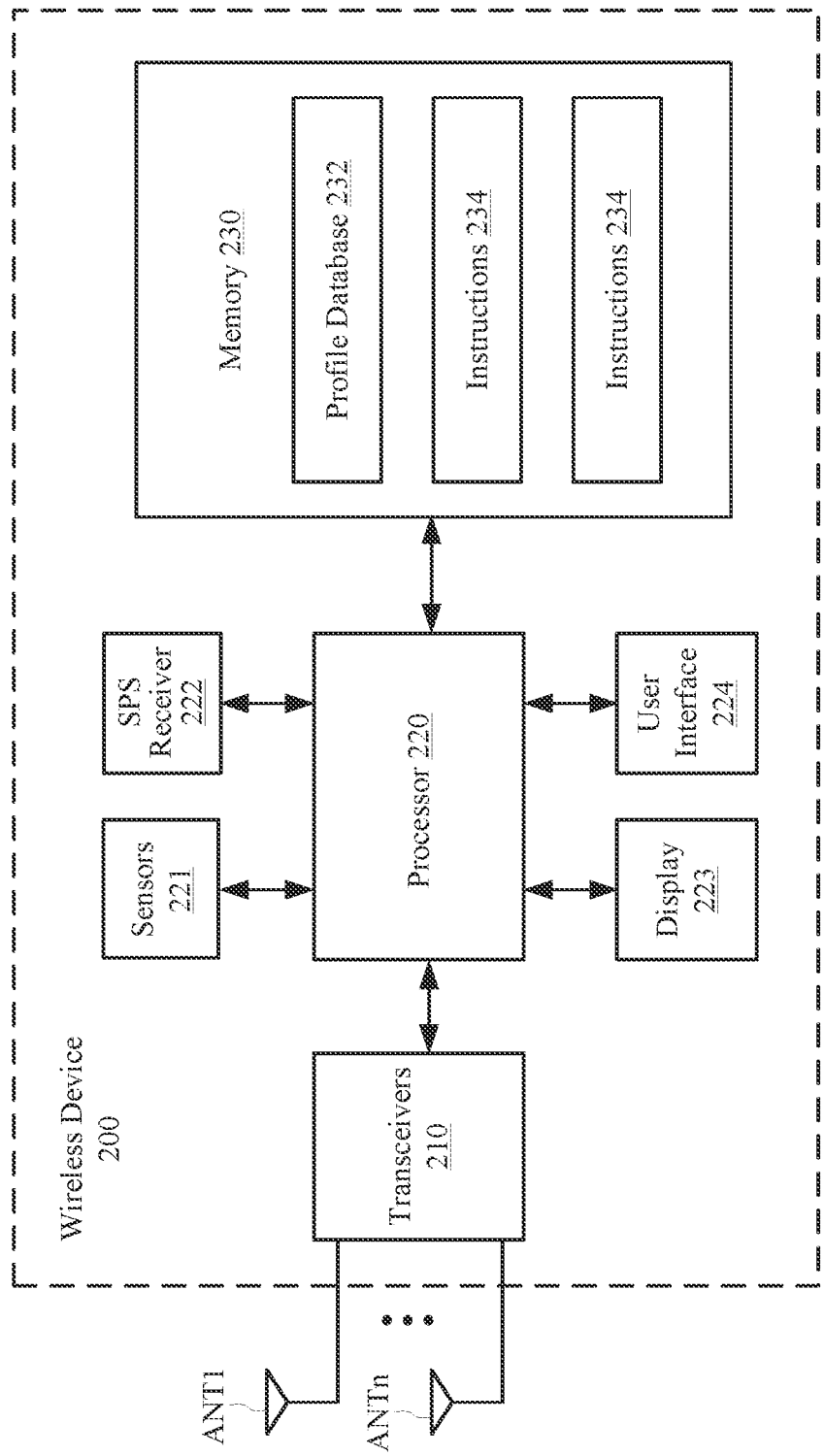
FIG. 2 is a block diagram of an example wireless device.

FIG. 2 shows an example wireless device 200. The wireless device 200 may be one example of the smartphone 110 of FIG. 1. The wireless device 200 includes one or more transceivers 210, one or more processors 220, a memory 230, and a number of antennas ANT1-ANTn. The transceivers 210 may be coupled to antennas ANT1-ANTn, either directly or through an antenna selection circuit (not shown for simplicity). The transceivers 210 may be used to transmit signals to and receive signals from APs, base stations, satellites, servers (such as the central server 130 of FIG. 1), and any other suitable wireless device. Although not shown in FIG. 2 for simplicity, the transceivers 210 can include any number of transmit chains to process and transmit signals to other wireless devices via one or more antennas (not shown for simplicity), and can include any number of receive chains to process signals received from the other wireless devices via the one or more antennas. The transceivers 210 may be configured to operate according to one or more suitable wireless communication protocols such as (but not limited to) wireless communications protocols specified by one or more Releases of the Third Generation Partnership Project (3GPP), by one or more amendments to the IEEE 802.11 family of wireless communication standards, the Bluetooth Interest Group, or other suitable communications technology. In addition, or in the alternative, the transceivers 210 may be configured for one or more suitable wired communication protocols including (but not limited to) Ethernet, coaxial, or optical communications.

The processors 220 may be or may include any number of commercially available microprocessors or central processing units (CPUs) capable of executing scripts or instructions of one or more software programs stored in associated memory (such as memory 230). In addition, or in the alternative, the processors 220 may be or may include any number of Application Specific Integrated Circuits (ASICs), Field Programmable Gate Arrays (FPGAs), Programmable Logic Devices (PLDs), Graphics Processing Units (GPUs), Digital Signal Processors (DSPs), Data Processing Units (DPUs), microcontrollers, hardware accelerator(s), or any combination thereof.

The wireless device 200 also may include one or more sensors 221, a satellite positioning system (SPS) receiver 222, a display 223, a user interface 224, and other suitable components not shown for simplicity. The sensors 221 may be any suitable sensor including, for example, an accelerometer, a compass, and so on. The SPS receiver 222 may be compatible with the Global Positioning System (GPS), the Global Navigation Satellite System (GLONASS), and any other global or regional satellite based positioning system. For example, the SPS receiver 222 may use signals received from one or more satellites (not shown for simplicity) to determine the location of the wireless device 200 on Earth.

The display 223 may be any suitable display that allows content to be presented to a user of the wireless device 200. In some aspects, the display 223 may be a touch-sensitive display that allows the user to enter commands, instructions, and other input to the wireless device 200. The user interface 224 may be any suitable interface device or component that allows the user to provide input to the wireless device 200. In some aspects, the user interface 224 may include a keyboard (virtual or physical), a touch pad, and so on.

The memory 230 may include a profile database 232 that stores any number of resolvable public identifiers and associated timestamps. In some instances, the profile database 232 may also include profile information for one or more wireless devices such as APs, base stations, wireless stations (STA), satellites, and other wireless devices. The profile information for a particular AP may include, for example, the AP's service set ID (SSID), channel information, country code information, received signal strength indicator (RSSI) values, supported data rates, connection history with one or more APs, a trustworthiness value of the AP (such as indicating a level of confidence about the AP's location, broadcast country code information, and so on), and any other suitable information pertaining to or describing the operation of the AP. The profile information for a particular base station may include, for example, the base station's identifier, carrier and channel information, country code information, RSSI values, and any other suitable information pertaining to or describing the operation of the base station. The profile information for a particular STA may include information including, for example, STA's MAC address, supported data rates, and any other suitable information pertaining to or describing the operation of the STA. The profile information for a particular satellite may include, for example, channel information, PN codes, ephemeris data, and any other suitable information pertaining to or describing the operation of the satellite or an associated satellite system.

The memory 230 may include a non-transitory computer-readable medium (such as one or more nonvolatile memory elements, such as EPROM, EEPROM, Flash memory, a hard drive, etc.) storing instructions that, when executed by the one or more processors 220, cause the wireless device 200 to perform any number of the operations described with reference to FIG. 4. The instructions may be any set of instructions to be executed directly (such as machine code) or indirectly (such as scripts) by the processors 220. For example, the instructions may be stored as computing device code on the computing device-readable medium. As such, the terms "instructions" and "programs" may be used interchangeably herein. The instructions may be stored in object code format for direct processing by the processor, or in any other computing device language including scripts or collections of independent source code modules.

Figure 3:
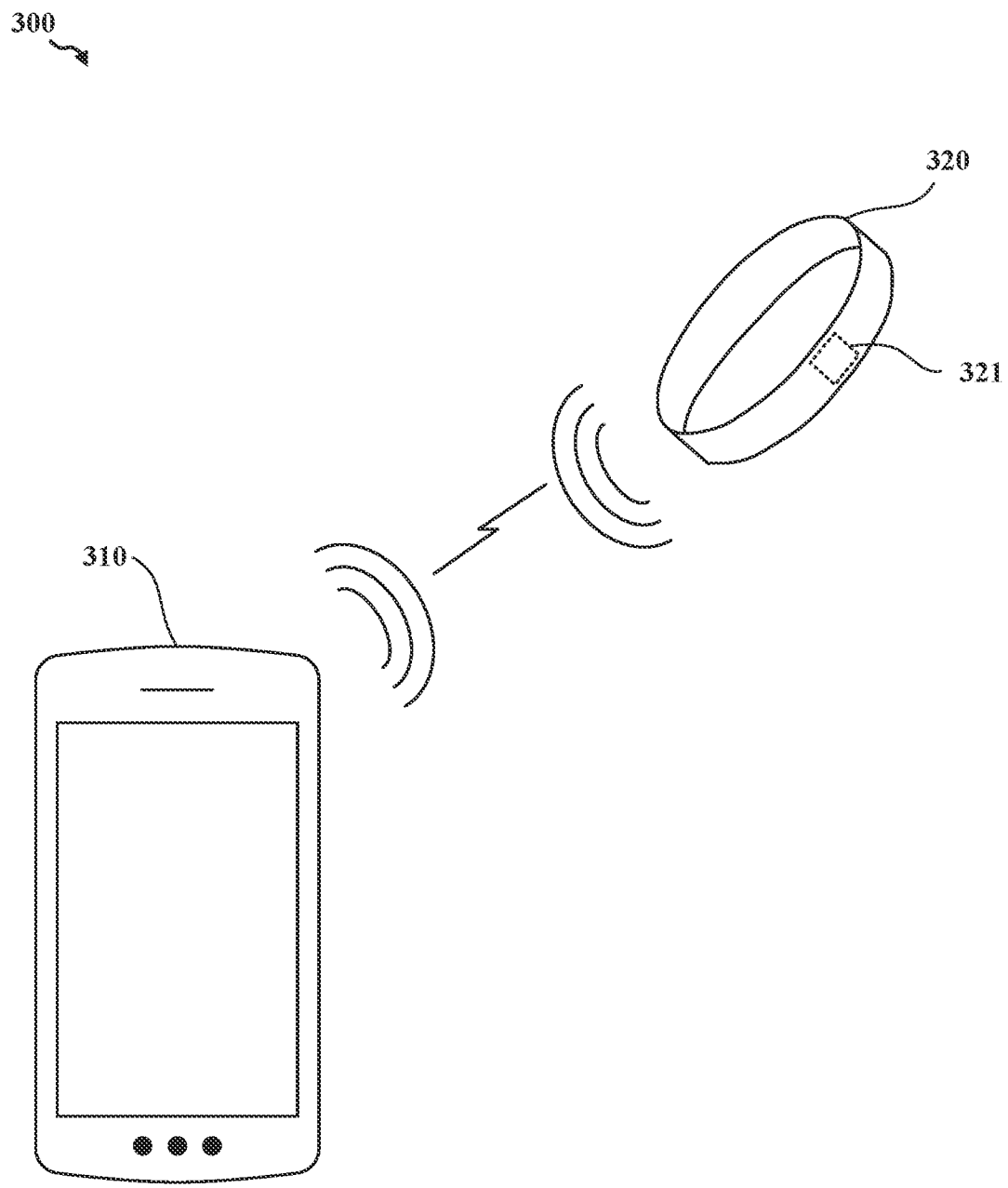
FIG. 3 shows a block diagram of an enhanced wireless tracking system.

FIG. 3 shows a block diagram of an enhanced wireless tracking system 300. The wireless tracking system 300 may include a smartphone 310 and a wireless tracking device 320. In some implementations, the smartphone 310 may be an example of the smartphone 110 of FIG. 1 or the wireless device 200 of FIG. 2. The wireless tracking device 320 may be implemented in a bracelet (as shown), a necklace, a belt, a key fob, a sticker, a smartwatch, a wrist sensor, or any other easily worn or carried device. The wireless tracking device 320 may include a BLE device 321 that can communicate with other BLE devices such as the smartphone 310. The BLE device 321 may be powered by a battery (not shown for simplicity) and/or through power harvested from radio-frequency (RF) transmissions.

The wireless tracking device 320 may be carried and/or worn by users that do not have access to, or do not wish to carry, a smartphone. In some cases, smartphone use may not be feasible or desirable by the user. The wireless tracking device 320, using the BLE device 321, can scan and record received resolvable public identifiers, and can also generate and transmit its own resolvable public identifiers in one or more BLE frames such as BLE advertising beacons. The wireless tracking device 320 may periodically upload tracking data to the smartphone 310. In some implementations, the tracking data may include received resolvable public identifiers, generated resolvable public identifiers, receive timestamps, transmit timestamps, signal strength information, distance information, and/or location information). The smartphone 310 can process the tracking data received from the wireless tracking device 320 and determine if the user was near or in contact with one or more possible virus carriers.

In some implementations, the smartphone 310 and the BLE device 321 can be paired with one another to facilitate the exchange of information between the smartphone 310 and the BLE device 321. As used herein, "pairing" may refer to the smartphone 310 establishing a verified and secure communication channel with the BLE device 321. In some implementations, the user may pair the BLE device 321 to the smartphone 310 by activating a pairing button or icon presented on a display screen of the smartphone 310, using Bluetooth discovery mechanisms, using near-field communications (NFC), or through any other feasible mechanism. After pairing, the BLE device 321 may be provisioned or configured by the smartphone 310. The provisioning may prepare and initialize the BLE device 321 to receive any suitable number of resolvable public identifiers from other wireless devices, timestamp the reception of the resolvable public identifiers, and store the resolvable public identifiers and their respective timestamps in local memory provided within the BLE device 321. The provisioning may also prepare the BLE device 321 to generate and transmit resolvable public identifiers to other nearby wireless devices. In some implementations, the BLE device 321 may transmit the resolvable public identifiers using Bluetooth communications, for example, by embedding the resolvable public identifiers in one or more BLE advertising beacons transmitted by the BLE device 321. In other implementations, the BLE device 321 may transmit or broadcast its resolvable public identifiers using other wireless communication technologies including (but not limited to) cellular communications and Wi-Fi communications (also known as WLAN communications). In some instances, the provisioning may include downloading, to the BLE device 321, software that can initialize and synchronize a clock or timer in the BLE device 321 with a clock or timer in the smartphone 310.

In some aspects, the provisioning may also establish a bonded relationship between the BLE device 321 and the smartphone 310. Once in a bonded relationship, the BLE device 321 and the smartphone 310 know each other's encryption keys, authentication credentials, MAC addresses, IPv4 or IPv6 addresses, and other information unique to each of the smartphone 310 and the BLE device 321. The mutual knowledge of one another's unique information may allow the smartphone 310 and the BLE device 321 to quickly establish a secure communications link or connection with each other. In some instances, the BLE device 321 and the smartphone 310 can form a secure relationship with one another. For example, the BLE device 321 may be configured to share certain information (such as tracking data collected while the BLE device 321 is away from the smartphone 310) with only the smartphone 310, thereby providing enhanced security for the BLE device 321.

In some implementations, the tracking device 320 can receive, collect, or otherwise obtain resolvable public identifiers while away from or out of wireless range of the smartphone 310, and later transmit the resolvable public identifiers and associated tracking information to the smartphone 310 when closer to or within wireless range of the smartphone 310. For example, a child wearing the wireless tracking device 320 may collect resolvable public identifiers during a time period while away from or out of wireless range of a parent's smartphone 320. When the child and parent are later together (e.g., within a certain distance of each other), the tracking device 320 and/or the smartphone 310 may detect the presence of one another and/or initiate a pairing operation that establishes a wireless communications link between the tracking device 320 and the smartphone 310. The BLE device 321 may then transmit or otherwise share tracking data determined while the BLE device 321 was away from the smartphone 310. The smartphone 310 can process the tracking data received from the BLE device 321 and determine if the child was near or in contact with one or more possible virus carriers.

In one implementation, the BLE device 321 may generate resolvable public identifiers associated with the user of smartphone 310 and/or the carrier of the BLE device 321. The resolvable public identifiers may indicate whether the user of the smartphone 310 and/or the carrier of the BLE device 321 is a possible virus carrier. The resolvable public identifiers may be generated periodically, and the BLE device 321 may transmit or broadcast the generated resolvable public identifiers to other nearby wireless devices (not shown for simplicity) with the same or different periodicity. For example, in some aspects, the periodicity may be approximately 15 minutes. In other aspects, the periodicity may be approximately 2 minutes. In some instances, the BLE device 321 may transmit the tracking data using one or more BLE advertising beacons. In some other aspects, the periodicity may be approximately 2 hours.

The BLE device 321 may also collect resolvable public identifiers by scanning for BLE advertising beacons (or other BLE or Bluetooth frames) transmitted by other wireless devices. When the BLE device 321 receives a resolvable public identifier (such as provided within a BLE advertising beacon), the BLE device 321 may store the resolvable public identifier along with a timestamp indicating the time at which the resolvable public identifier was received. The resolvable public identifiers, timestamps, link quality information, signal strength information, and so on may be stored in a local memory of the BLE device 321.

After a secure connection is established between the smartphone 310 and the BLE device 321, the BLE device 321 can upload the collected resolvable public identifiers to the smartphone 310. In some instances, the BLE device 321 can upload tracking data associated with the collected resolvable public identifiers to the smartphone 310. The smartphone 310 can download resolvable public identifiers from the central server (not shown in FIG. 3 for simplicity). If one or more of the downloaded resolvable public identifiers match any of the collected resolvable public identifiers received or shared by the BLE device 321, then the BLE device 321 may have been near or in contact with one or more possible virus carriers.

As described above, the smartphone 310 may also collect and store resolvable public identifiers to track exposure to possibly contagious people. Thus, the smartphone 310 may also determine if any of the resolvable public identifiers provided by the BLE device 321 matches any of the resolvable public identifiers collected by the smartphone 310. If a match is found, then the smartphone 310 may provide a notification to the user of the smartphone 310 and/or a person wearing the BLE device 321. In some instances, the smartphone 310 may suggest one or more actions or precautions to the user based on the matching resolvable public identifiers.

In various implementations, the smartphone 310 may be paired with two or more wireless tracking devices tracking device 320 or BLE devices 321. The smartphone 310 may determine if the resolvable public identifiers received from each of the wireless tracking devices or BLE devices 321 matches any of the resolvable public identifiers downloaded from the central server. In some instances, the smartphone 310 may compare the downloaded resolvable public identifiers with the resolvable public identifiers collected from all nearby wireless devices associated with the user.

If the smartphone 310 determines or identifies a match between one of the downloaded resolvable public identifiers and one or more of the collected resolvable public identifiers, or if the user of the wireless tracking device 320 is determined to be a virus carrier, the smartphone 310 can upload the resolvable public identifiers generated by the BLE 321 to the central server. Uploading of the resolvable public identifiers and/or associated tracking data may be optional.

Figure 4:
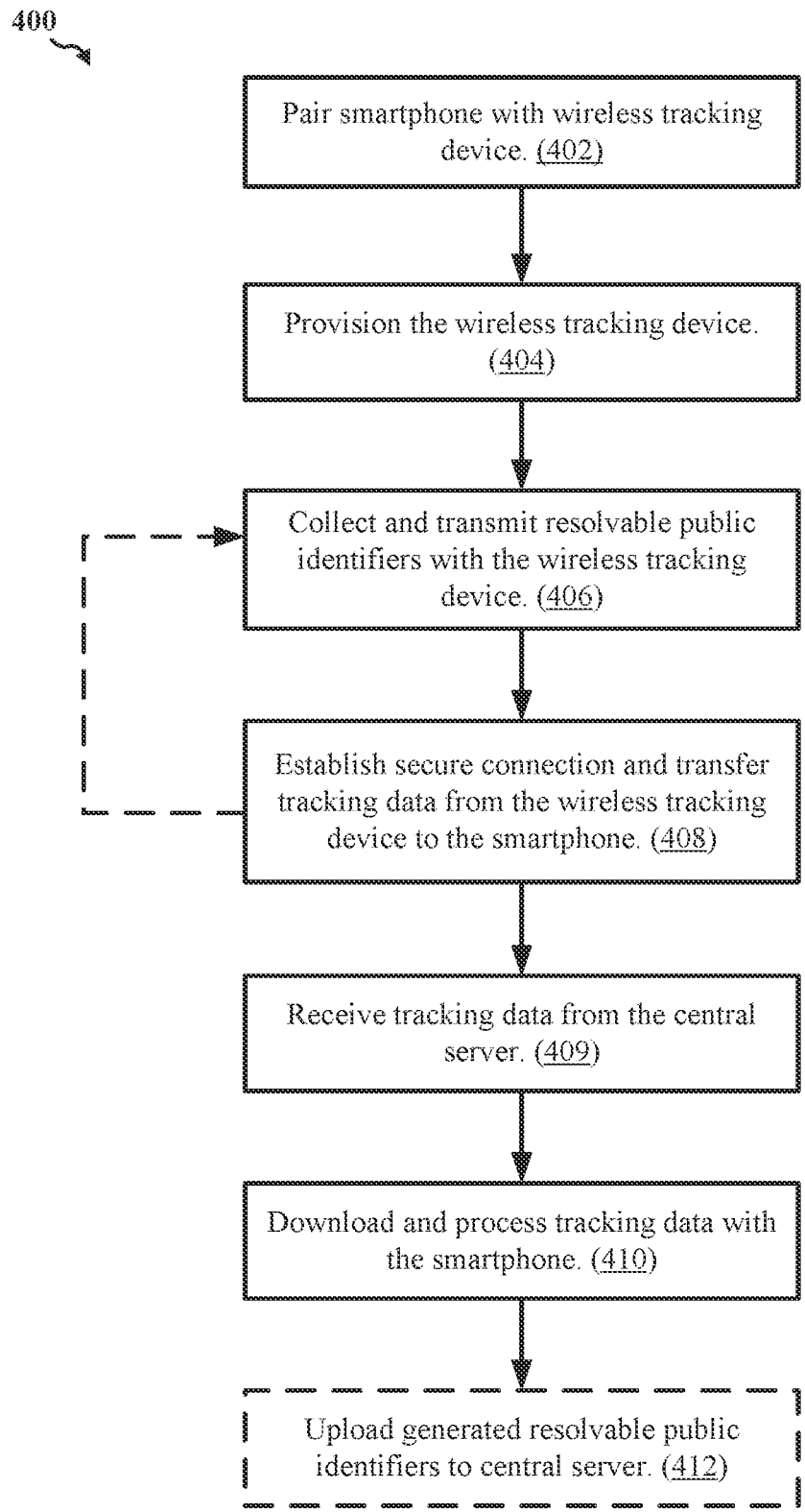
FIG. 4 is a flowchart depicting an example operation for operating a wireless tracking device.

FIG. 4 is a flowchart depicting an example operation 400 for operating a wireless tracking device. Although described herein as being performed by the smartphone 310 and/or the wireless tracking device 320 of FIG. 3, the operation may be performed by any suitable wireless devices. Some implementations may perform the operations described herein with additional operations, fewer operations, operations in a different order, operations in parallel, and/or some operations differently.

The operation 400 begins as the smartphone 310 pairs with the wireless tracking device (402). The smartphone 310 and the wireless tracking device 320 may both include BLE capable transceivers. In some implementations, the wireless tracking device 320 may include the BLE device 321 to pair and communicate with the smartphone 310. The pairing may include a button push or NFC communications to select and/or confirm the pairing of the wireless tracking device 320.

The smartphone 310 provisions the wireless tracking device 320 (404). The provisioning may include setting and/or synchronizing a clock in the wireless tracking device 320. The provisioning may also initialize and prepare the wireless tracking device 320 to generate and transmit resolvable public identifiers in BLE advertising beacons. The provisioning may establish a bonded relationship between the BLE device 321 and the smartphone 310. The provisioning may also include receiving software from the smartphone 310.

The wireless tracking device 320 collects and transmits resolvable public identifiers (406). The wireless tracking device 320 may scan for BLE advertising beacons and record any resolvable public identifiers found therein along with related timestamps. The wireless tracking device 320 may also generate resolvable public identifiers and broadcast them in advertising beacons.

The wireless tracking device 320 establishes a secure connection and transfers the tracking data to the smartphone 310 (408). Once the secure connection is established, the wireless tracking device 320 may upload the collected resolvable public identifiers to the smartphone 310. In some implementations, the operation may optionally return to 306 (shown with a dotted arrow) any feasible number of times.

The smartphone 310 receives tracking data from the central server (409). The smartphone 310 may receive resolvable public identifiers, timestamps and signal strength information associated with other wireless devices that may have been in an area near the smartphone 310 and/or the wireless tracking device 320.

The smartphone 310 processes the tracking data from the wireless tracking device (410). For example, the smartphone 310 determine whether the resolvable public identifiers from the central server match any resolvable public identifiers uploaded from the wireless tracking device 320. If a match is found, then the wireless tracking device 320 may have been in contact with a virus carrier. In response, the smartphone 310 may notify the user.

The smartphone 310 may upload the generated resolvable public identifiers from the wireless tracking device 320 to the central server (412). This operation is optional as indicated by the dashed lines in FIG. 3. If a match is found or if the user of the wireless tracking device 320 is found to be a virus carrier through independent testing, then the user of the smartphone 310 may upload the generated resolvable public identifiers and associated timestamps to the central server to enable other users to determine exposure to the virus.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method performed by a wearable Bluetooth Low Energy (BLE) device, comprising:
    collecting one or more resolvable public identifiers from one or more wireless devices, each of the one or more resolvable public identifiers indicating whether a user associated with a respective one of the wireless devices is a possible virus carrier;
    generating a timestamp for each of the collected resolvable public identifiers, each timestamp indicating a time at which a corresponding resolvable public identifier was received by the BLE device;
    sharing the collected resolvable public identifiers and their corresponding timestamps with a paired device; and
    receiving, from the paired device, an indication of whether one or more of the collected resolvable public identifiers is associated with a possible virus carrier.

2. The method of claim 1, wherein the one or more resolvable public identifiers are collected in one or more BLE advertising beacons, and the indication further indicates that a user of the BLE device was within a BLE communications range of the possible virus carrier.

3. The method of claim 1, wherein the indication is based on a comparison between the one or more collected resolvable public identifiers and a plurality of stored resolvable public identifiers.

4. The method of claim 3, wherein the plurality of stored resolvable public identifiers are available from a server.

5. The method of claim 3, wherein the comparison is associated with a match between at least one of the collected resolvable public identifiers and one or more of the stored resolvable public identifiers.

6. The method of claim 1, further comprising:
    notifying a user of the BLE device of the possible virus carrier.

7. The method of claim 1, further comprising:
    generating a unique resolvable public identifier indicative of whether a user of the BLE device is a possible virus carrier; and
    transmitting the unique resolvable public identifier to one or more nearby devices.

8. The method of claim 7, wherein the unique resolvable public identifier is transmitted in a BLE advertising beacon.

9. The method of claim 1, wherein the paired device is one of a cellular phone, a smartphone, a tablet computer, a laptop computer, or another BLE device, and wherein the BLE device is included within or attached to one of a bracelet, neckless, a belt, watch, a smartwatch, or a key fob.

10. The method of claim 1, further comprising:
    downloading one or more resolvable public identifiers from a remote server;
    comparing the one or more downloaded resolvable public identifiers with the collected resolvable public identifiers;
    identifying one or more of the collected resolvable public identifiers that match a respective downloaded resolvable public identifier based on the comparison;
    determining whether the user came into contact with one or more of the possible virus carriers based on the one or more identified matches.

11. The method of claim 10, further comprising:
    comparing the timestamps of the one or more identified resolvable public identifiers with respective timestamps of the downloaded resolvable public identifiers that match the one or more respective identified resolvable public identifiers; and
    determining whether the timestamp of each of the identified resolvable public identifiers is within a time period of the respective timestamps of the downloaded resolvable public identifiers that match the respective identified resolvable public identifier.

12. A Bluetooth Low Energy (BLE) device, comprising:
one or more transceivers;
one or more processors; and
a memory storing instructions that, when executed by the one or more processors, cause the BLE device to:
collect one or more resolvable public identifiers from one or more wireless devices, each of the one or more resolvable public identifiers indicating whether a user associated with a respective one of the wireless devices is a possible virus carrier;
generate a timestamp for each of the collected resolvable public identifiers, each timestamp indicating a time at which a corresponding resolvable public identifier was received by the BLE device;
share the collected resolvable public identifiers and their corresponding timestamps with a paired device; and
receive, from the paired device, an indication of whether one or more of the collected resolvable public identifiers is associated with a possible virus carrier.

13. The BLE device of claim 12, wherein the one or more resolvable public identifiers are collected in one or more BLE advertising beacons, and the indication further indicates that a user of the BLE device was within a BLE communications range of the possible virus carrier.

14. The BLE device of claim 12, wherein the indication is based on a comparison between the one or more collected resolvable public identifiers and a plurality of stored resolvable public identifiers.

15. The BLE device of claim 14, wherein the comparison is associated with a match between at least one of the collected resolvable public identifiers and one or more of the stored resolvable public identifiers.

16. The BLE device of claim 12, wherein execution of the instructions further causes the BLE device to:
generate a unique resolvable public identifier indicative of whether a user of the BLE device is a possible virus carrier; and
transmit the unique resolvable public identifier to one or more nearby devices.

17. The BLE device of claim 16, wherein the unique resolvable public identifier is transmitted in a BLE advertising beacon.

18. The BLE device of claim 12, wherein the paired device is one of a cellular phone, a smartphone, a tablet computer, a laptop computer, or another BLE device, and wherein the BLE device is included within or attached to one of a bracelet, neckless, a belt, watch, a smartwatch, or a key fob.

19. The BLE device of claim 12, wherein execution of the instructions further causes the BLE device to:
download one or more resolvable public identifiers from a remote server;
compare the one or more downloaded resolvable public identifiers with the collected resolvable public identifiers;
identify one or more of the collected resolvable public identifiers that match a respective downloaded resolvable public identifier based on the comparison; and
determine whether the user came into contact with one or more of the possible virus carriers based on the one or more identified matches.

20. The BLE device of claim 19, wherein execution of the instructions further causes the BLE device to:
compare the timestamps of the one or more identified resolvable public identifiers with respective timestamps of the downloaded resolvable public identifiers that match the one or more respective identified resolvable public identifiers; and
determine whether the timestamp of each of the identified resolvable public identifiers is within a time period of the respective timestamps of the downloaded resolvable public identifiers that match the respective identified resolvable public identifier.

* * * * *